United States Patent [19]

Osawa et al.

[11] Patent Number: 5,930,367
[45] Date of Patent: Jul. 27, 1999

[54] APPARATUS FOR RECORDING/REPRODUCING OR TRANSMITTING/RECEIVING SIGNAL DATA HAVING A PORTION OF AN ERROR CORRECTION CODE REPLACED WITH OTHER INFORMATION AND METHODS THEREOF

[75] Inventors: Yoshitomo Osawa, Kanagawa; Yoichiro Sako; Shozo Masuda, both of Tokyo; Akira Kurihara; Isao Kawashima, both of Kanagawa, all of Japan

[73] Assignee: Sony Corporation, Tokyo, Japan

[21] Appl. No.: 08/705,188

[22] Filed: Aug. 29, 1996

[30] Foreign Application Priority Data

Aug. 31, 1995 [JP] Japan .................................. 7-224070

[51] Int. Cl.⁶ .................................................. H04K 1/00
[52] U.S. Cl. ...................................................... 380/49
[58] Field of Search ................................. 380/9, 49

[56] References Cited

U.S. PATENT DOCUMENTS

| | | | |
|---|---|---|---|
| 4,788,685 | 11/1988 | Sako et al. ............................. | 371/38 |
| 5,185,792 | 2/1993 | Shimada ................................. | 380/4 |
| 5,506,902 | 4/1996 | Kubota ................................... | 380/9 |
| 5,596,639 | 1/1997 | Kikinis .................................. | 380/4 |
| 5,668,879 | 9/1997 | Ibaraki et al. ......................... | 380/41 |
| 5,699,434 | 12/1997 | Hogan .................................... | 380/49 |

*Primary Examiner*—David Cain
*Attorney, Agent, or Firm*—Frommer Lawrence & Haug, LLP.; William S. Frommer; Dennis M. Smid

[57] ABSTRACT

An apparatus for processing digital data signals which may be used in recording/reproducing and transmitting/receiving of such signals. During recording or transmission, error correction codes are added to the digital signals and a portion of such error correction codes is replaced with other information. Such other information may provide an indication as whether the digital signals are original signals or a copy thereof. During reproduction or reception, the other information is extracted and utilized in a predetermined manner. For example, reproduced digital signals may or may not be outputted depending on whether the extracted information indicates that the digital signals are original signals or a copy thereof. As a result, unauthorized copying of signals may be discouraged or prevented. Furthermore, by replacing a portion of the error correction code with the other information, storage capacity for the digital signals and/or the rate for processing such signals may not be adversely effected.

72 Claims, 8 Drawing Sheets

| SELECTION NUMBER | PRE-SET VALUE | SELECTION NUMBER | PRE-SET VALUE |
|---|---|---|---|
| 0 | $0001 | 8 | $4080 |
| 1 | $4000 | 9 | $2040 |
| 2 | $2000 | 10 | $1020 |
| 3 | $1000 | 11 | $0810 |
| 4 | $0800 | 12 | $0408 |
| 5 | $0400 | 13 | $0204 |
| 6 | $0200 | 14 | $0102 |
| 7 | $0100 | 15 | $4081 |

APPARATUS FOR RECORDING/ REPRODUCING OR TRANSMITTING/ RECEIVING SIGNAL DATA HAVING A PORTION OF AN ERROR CORRECTION CODE REPLACED WITH OTHER INFORMATION AND METHODS THEREOF

BACKGROUND OF THE INVENTION

The present invention relates to a technique for recording and/or reproducing digital signals onto and/or from a record medium, a technique for transmitting and/or receiving digital signals, and a recording medium having digital signals recorded thereon.

As is to be appreciated, there is an ever increasing need to record and/or reproduce, transmit and/or receive, or otherwise handle a relatively large volume of information at a relatively high rate. In an effort to increase such handling capacity, main signals (such as digital video or audio signals) to be recorded or transmitted may be compressed. Additionally, such handling capacity may be further improved by minimizing the amount of non-main data. That is, the addition of non-main or other digital information may increase the amount of data which is to be recorded on a recording medium or transmitted by way of a transmission medium or the rate at which the main signals are recorded/ reproduced or transmitted/received.

Although minimizing non-main data may be desirable, situations may arise wherein non-main data or other digital information should be added to the main signals. For example, a non-main signal may be added to the main signals so as to discourage or prevent unauthorized copying of video, audio or data signals or the like, as more fully described below.

More specifically, recording media for optically recording digital video signals, digital audio signals, computer program data or other information signals, such as the so-called compact disc (CD) for music or the CD-ROM for data recording, are currently in widespread use. Recently, progress is proceeding to make a so-called digital video disc (DVD) the next generation of recording medium. Audio or video signals recorded on a recording media (such as a CD, CD-ROM or DVD) may be reproduced by a reproducing apparatus and copied onto a recordable/reproducible recording medium (such as a hard disc). Thereafter, the data copied on the hard disc may be supplied to an encoder system, such as CD, CD-ROM or DVD type system, so as to produce a new CD, CD-ROM or DVD having the same signals as the original signals. Such new or copied recording media may be substantially identical to the originally recorded signals. Accordingly, it may be difficult to determine whether the signals recorded on a recording medium are the original signals or copied signals. Similar difficulties may also occur with other types of recording medium, such as with a tape-type recording medium and so forth.

In an effort to prevent the use of unauthorized copying of original audio, video, data or other types of signals, it may be desirable to determine or identified whether the signals recorded on various types of recording media are original signals or copied signals. (That is, it may be desirable to determine the so-called hysteresis of the recording medium.) One technique of providing an indication as to whether the recorded signals are originally recorded signals or copies thereof is to record information at a specified area on the recording medium which indicates that the respective recording medium has original signals or copied signals recorded thereon. However, this technique may utilize an area on the recording medium to record such indication information which may otherwise be used to record video, audio or data signals. As is to be appreciated, it would be desirable to provide a technique whereby the signals recorded on a recording medium may be identified from the signals themselves as being either original signals or copied signals without utilizing additional recording area for information which provides such indication.

A technique in which the digital information is buried in the picture information or the like is described in JP Patent Publication JP-A-6-315132 (1994) to Kokai. However, such technique may not be desirable in that the information can be packed.

OBJECTS AND SUMMARY OF THE INVENTION

An object of the present invention is to provide a signal recording/reproducing and/or transmitting/receiving technique wherein desired digital information other than main signals (such as digital video signals or digital audio signals) may be recorded or transmitted along with the main signals with minimum adverse effects on the amount of video or audio data which may be recorded in a recording medium and/or the rate at which the digital video or audio signals may be recorded/reproduced or transmitted/received.

Another object of the present invention is to provide a technique as aforesaid wherein a portion of an error correction code of the main signals is replaced with the desired digital information.

A further object of the present invention is to provide a technique as aforesaid wherein the desired digital information provides an indication as to whether the main signals are original signals or a copy of the original signals.

A still further object of the present invention is to provide a technique as aforesaid wherein the main signals are supplied from a reproducing apparatus if the indication provided by the desired digital information indicates that the main signals are original signals and wherein the main signals are inhibited from being supplied from the reproducing apparatus if the indication provided by the desired digital information indicates that the main signals are a copy of the original signals.

A yet further object of the present invention is to provide a technique as aforesaid wherein the main signals are ciphered or scrambled in accordance with the desired digital information.

Another object of the present invention is to provide a record medium having main signals (such as digital video or audio signals) and desired digital information recorded thereon.

In accordance with an aspect of the present invention, a signal recording method and apparatus is provided. The method comprises the steps of appending an error correction code at a predetermined interval or unit of a digital signal, replacing a predetermined portion of the error correction code with specified information, and recording the digital signal having the error correction code partially replaced by the specified information onto a record medium. The signal recording apparatus comprises elements which correspond to the signal recording method.

In accordance with another aspect of the present invention, a signal reproducing method and apparatus is provided. The method comprises the steps of reproducing a digital signal from a record medium, wherein the digital signal has a predetermined unit (or interval) with an error correction code in which a predetermined portion of the error correction code has been replaced with specified information; and extracting the specified information from the predetermined portion of the error correction code before decoding the error correction code. The signal reproducing apparatus comprises elements which correspond to the signal reproducing method.

In accordance with a further aspect of the present invention, a signal transmission method and apparatus is provided. The method comprises the steps of appending an error correction code to a predetermined unit of a digital signal, replacing a predetermined portion of the error correction code with specified information, and transmitting the digital signal having the error correction code partially replaced by the specified information. The signal transmitting apparatus comprises elements which correspond to the signal transmission method.

In accordance with a still further aspect of the present invention, a signal receiving method and apparatus is provided. The method comprises the steps of receiving a digital signal having a predetermined unit with an error correction code in which a predetermined portion of the error correction code has been replaced with specified information, and extracting the specified information from the predetermined portion of the error correction code before decoding the error correction code.

Thus, according to the present invention, a portion of an error correction code of a digital signal is replaced with desired or specified information which may be recorded or transmitted along with the digital signal. During reproduction or reception, the specified information can be extracted from such portion of the error correction code and utilized in a predetermined manner. For example, the reproduced specified information may be used to determine whether the digital signal is an original signal or a copy of the original signal, whereupon, in accordance with such determination, a reproduced digital signal is either supplied from a reproducing apparatus or inhibited from being supplied therefrom.

By replacing a predetermined portion of the error correction code(s) for the digital signals with the specified information, the present invention reduces adverse effects on the amount of digital signal data which may be recorded in a recording medium and/or the rate at which the digital signal data may be recorded/reproduced or transmitted/received which may otherwise result by the addition of the specified information.

Other objects, features and advantages according to the present invention will become apparent from the following detailed description of illustrated embodiments when read in conjunction with the accompanying drawings in which corresponding components are identified by the same reference numerals.

DESCRIPTION OF THE PREFERRED EMBODIMENTS

Preferred embodiments of the present invention will now be described with reference to the accompanying drawings. Initially, a method of adding or appending desired digital information (hereinafter, referred to as "identification information") to main signals (such as digital video signals or digital audio signals) will be described. Thereafter, apparatus utilizing such method will be described.

Figure 1:
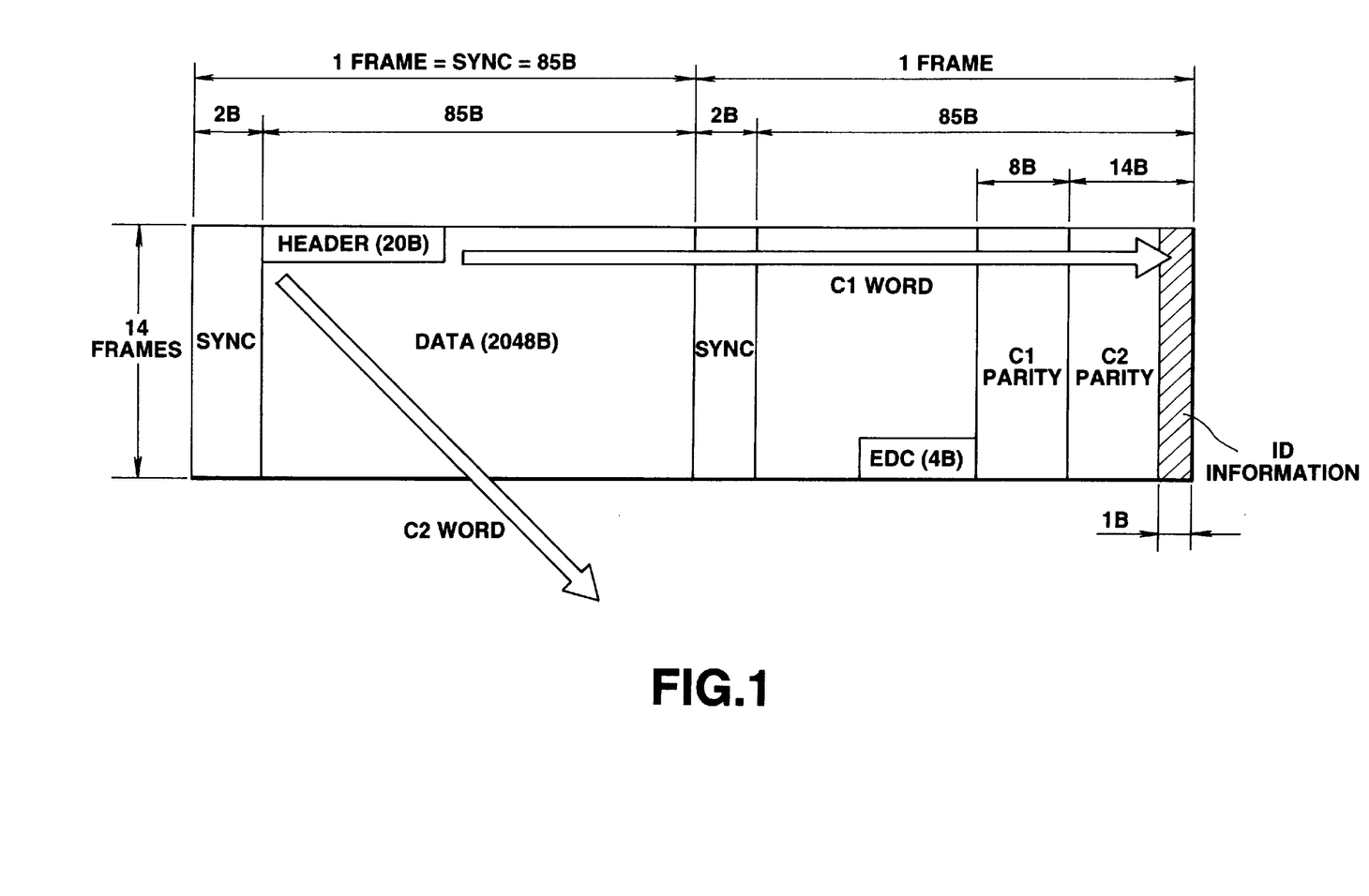
FIG. 1 illustrates a format of a sector to which reference will be made in explaining the present invention.

A format of a sector which may be used for recording the main signals on a recording medium is illustrated in FIG. 1. As shown therein, each sector includes an array of two horizontal frames and 14 vertical frames for a total of 28 frames. A frame is a unit of insertion of a synchronization signal.

In the sector format of FIG. 1, 2-bytes of synchronization signals are arranged at the leading end of a frame followed by a 85-byte data area. The leading 20 bytes of the data area may be used as a header. Approximately 2k bytes (2048 bytes) of user or pre-set data may be arranged in the data area next to the header. The sector further includes a 4-byte error detection code (EDC) for detecting errors in the 2k byte data. Parity or error correction codes C1 and C2 are arranged at the rightmost end of two horizontal frames. These 8-bit parity C1 and 14-bit parity C2 error correction codes may be used for 2-frames or 170-bytes of data. More specifically, the C1 parity series may be used for 2-frame data along the transverse or horizontal direction, and the C2 parity series may be interleaved encoded with the C1 parity series and used for 170-byte data in an oblique direction extending from the upper left portion to the lower right portion as indicated by the arrow in FIG. 1.

A portion of the parity or error correction codes may be replaced or substituted with identification information. Such substitution does not impair the error correction capability of the parity codes so that data reproduction is not adversely affected. For example, a sector having 14 vertical frames may have one byte of identification information per series of C2 parity so as to total 14 bytes. During normal reproduction, the C2 parity may utilize 7 bytes for error correction coding. Since 13 bytes (that is, 14−1=13 bytes) are available for the C2 parity even when one byte of identification information is substituted therein, no adverse effects may be incurred during normal reproduction. Thus, this arrangement permits the identification information to be added to a sector without effectively increasing the amount of information contained therein. As a result, such arrangement enables the identification information to be recorded along with the main information in an area of a recording medium which is substantially the same as that for recording the main information without the identification information.

The identification information may represent a desired parameter or characteristic pertaining to the recorded (or transmitted) data. For example, the identification information may represent duplication hysteresis information of a recording medium, transmission hysteresis information of transmitted contents and cipher key information.

As hereinafter more fully described, the sector having the identification information may be written in a table-of-contents (TOC) area of recording medium which may be a disc-shaped medium, or alternatively, such sector may be written on a track represented by a so-called negative address wherein access thereto may be normally limited or restricted, so as to raise confidentiality and reduce the likelihood of readily altering the identification information.

During reproduction of the sector data recorded on a record medium, the identification information which was substituted for a portion of the parity may be reproduced substantially simultaneously with the respective error correction or parity code.

The identification information may be appended or added to a plurality of sectors which may be recorded on a sole track, on the inner most and outer most tracks of a disc-shaped record medium, or in each layer of a record medium having two or more recording layers. Such recording of the identification information in a plurality of sectors provides redundancy. As a result, if the recording operation is performed repeatedly or in a distributed manner, dropout of the identification information which may be caused by defects or flaws in the record medium may be effectively compensated for or prevented. Further, error correction codes may be added to the identification information itself. For example, if the number of bytes of the identification information is 14, as described above, 10 bytes may be allocated to the identification information and the remaining 4 bytes may be allocated to the error correction codes. If the error correction codes are added to the identification information itself and recorded in a distributed manner on a disc-shaped recording medium wherein each full-round track has 10 sectors, 140 bytes may be allocated for the identification information of the 10 sectors. Of these 140 bytes, 100 bytes and 40 bytes may be respectively allocated to the identification information and the error correction codes therefor. Since a sector having identification information may have a lower error correction capability than a sector not having such identification information, useful information may not be written in the user data area of the sector having the added identification information so as to reduce the likelihood of adverse effects on user data.

A signal recording apparatus which enables a portion of a parity code to be replaced with identification information and recorded on a recording medium along with main signals (e.g., video or audio signals) will now be described with reference to FIG. 2.

Figure 2:
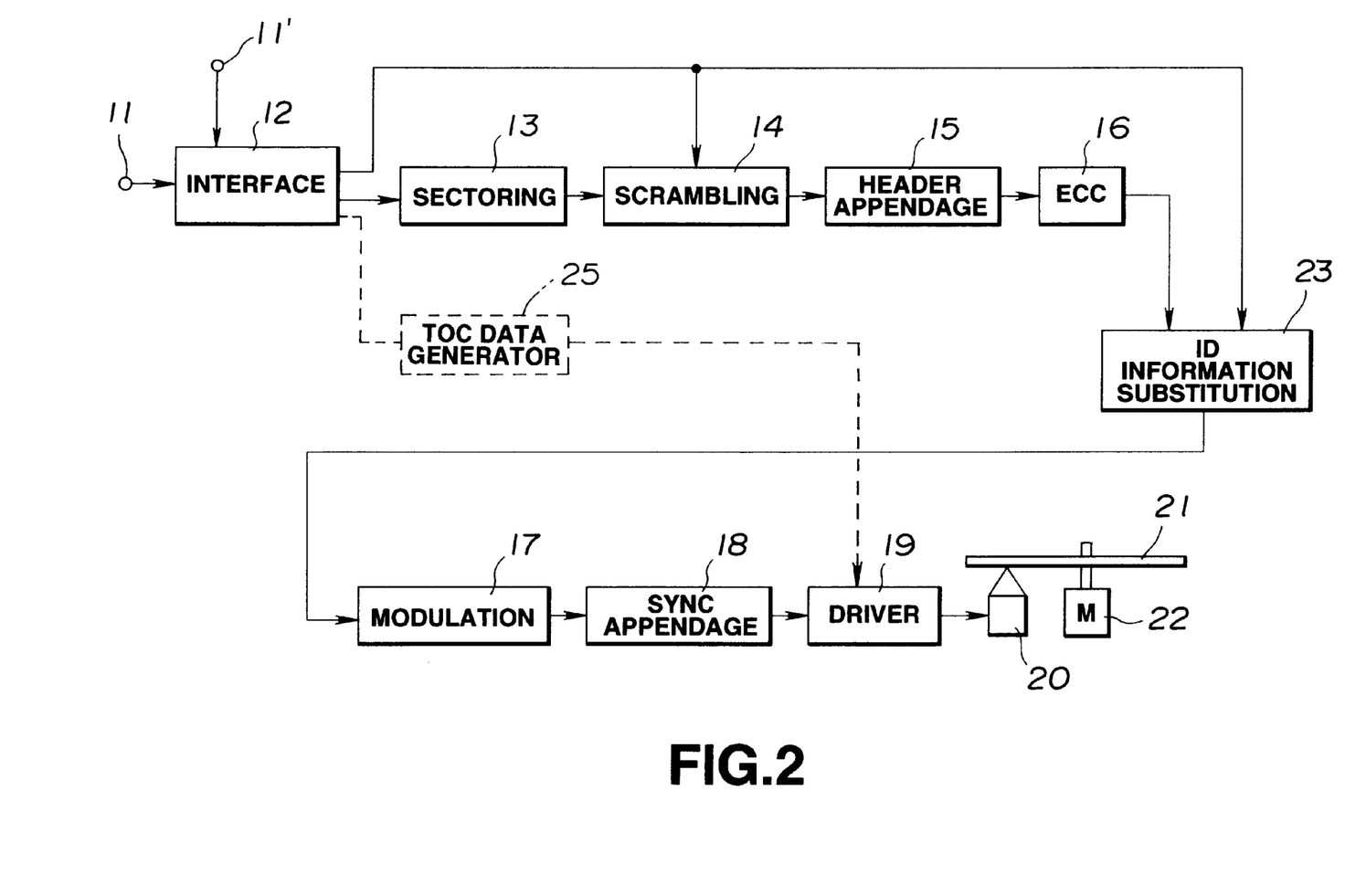
FIG. 2 is a diagram of a signal recording apparatus according to an embodiment of the present invention.

As shown in FIG. 2, the present recording apparatus generally includes an interface circuit 12, a sectoring circuit 13, a scrambling circuit 14, a header appendage circuit 15, an error correction coding (ECC) circuit 16, an identification information substitution circuit 23, a modulation circuit 17, a synchronization appendage circuit 18, and a driving circuit 19.

Digital data, such as digital audio signals, digital video signals, computer data or the like, may be supplied to an input terminal 11. The input digital data is supplied by way of the interfacing circuit 12 to the sectoring circuit 13, whereupon the data is arranged or sectorized in terms of a predetermined data amount (such as 2048 bytes as shown in FIG. 1) so as to form units. The sectorized data is supplied to the scrambling circuit 14 so as to be scrambled or randomized such that the same byte pattern does not appear in succession so as to enable signals to be read and written appropriately. The scrambled or randomized data is supplied to the header appendage circuit 15, wherein header data (such as sector addresses) are arranged at a leading end of each sector, and error detection and correction codes EDC are arranged in a manner as previously described. Output data of the header appendage circuit 15 is supplied to the error correction encoding circuit 16 which may delay the received data and perform parity calculations so as to form parities C1 and C2 which are added to the data.

An output from the error correction encoding circuit 16 is supplied to the identification information substitution circuit 23. The identification information substitution circuit 23 further receives identification information by way of an input terminal 11' and the interfacing circuit 12. The identification information substitution circuit 23 is adapted to substitute the identification information for a portion of the C2 parity, in a manner as previously described.

An output digital signal having identification information from the identification information substitution circuit 23 is supplied to the modulation circuit 17, wherein the received signal is modulated in a predetermined manner. For example, the modulation circuit 17 may convert 8-bit data into 16 channel-bit modulated data. The modulated data is supplied to the synchronization appendage circuit 18 wherein synchronization signals are added to the modulated data. Such synchronization signals may have a pattern which does not conform to the modulation rule of the respective predetermined modulation system in terms of the pre-set data volume for the unit. An output from the synchronization appendage circuit 18 is supplied to the driving circuit or driver 19 which amplifies the received signals to a predetermined level and supplies the amplified signals to a recording/reproducing head 20, wherein the signals are recorded on a recording medium 21.

As an example, the recording/reproducing head 20 may record (or reproduce) the amplified signals optically or photo-magnetically by use of a laser beam. More specifically, during recording, the recording/reproducing head 20 is responsive to the modulated signals from the driver 19 to emit a laser light beam which is radiated onto the record medium 21. The recording medium 21 may be rotated at a constant linear velocity by a spindle motor 22. As a result, pits corresponding to the recording signals may be formed on the recording medium 21.

Figure 3:
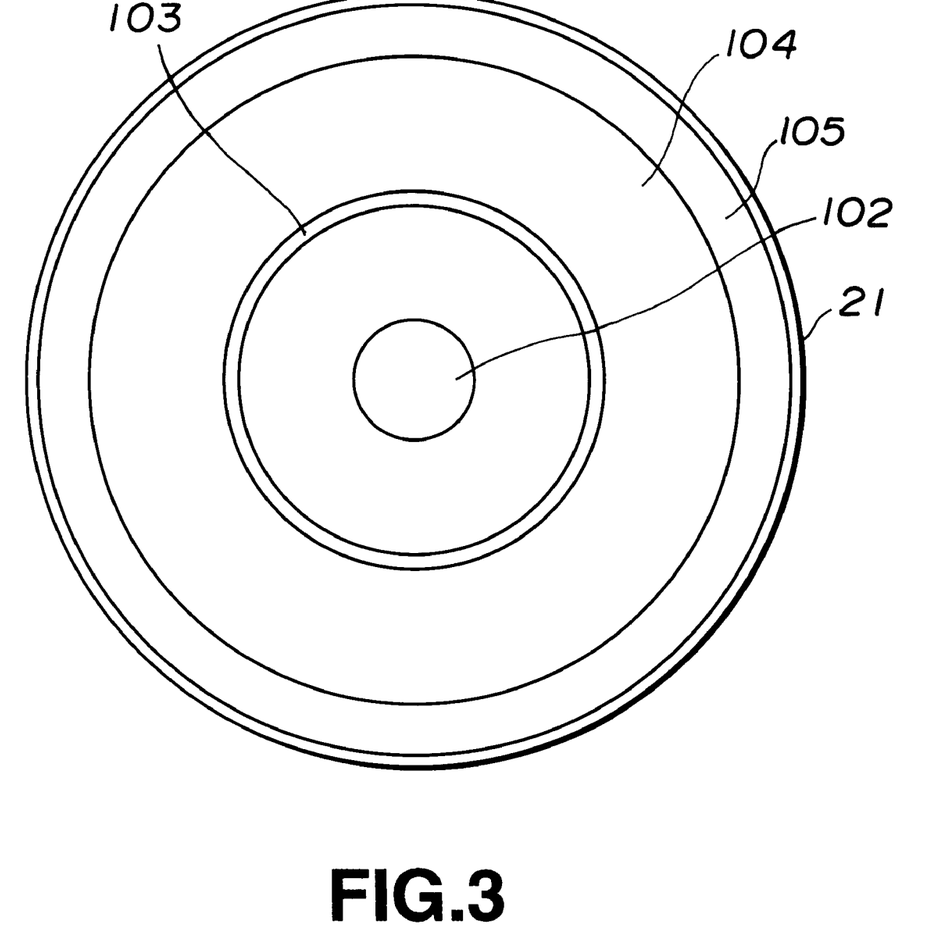
FIG. 3 is a diagram of a record medium.

An example of the disc-shaped recording medium 21 is illustrated in FIG. 3. As shown therein, the disc-shaped recording medium 21 may include a center aperture 102, a lead-in or table-of-contents (TOC) area 103 which may operate as a program management area, a program area 104 wherein program data may be recorded, and a lead-out area 105 which may operate as a program end area. In such optical disc, audio or video data may be recorded in the program area 104, while time information (such as that pertaining to the audio or video data) may be managed by data in the lead-in area 103.

Thus, by utilizing the present recording apparatus of FIG. 2, identification signals may be recorded on a recording medium without effectively increasing the amount or volume of the recorded information. As such, neither the recording area nor the recording rate is adversely affected.

As an alternative to the above-described arrangement of the recording apparatus of FIG. 2, the scrambling circuit 14 may be provided downstream of the header appendage circuit 15 whereupon the header digital data is scrambled by the scrambling circuit 14 and the resulting scrambled data is supplied to the error correction encoding circuit 16. Additionally, and as hereinafter more fully described, the scrambling circuit 14 may also be utilized to cipher the output data of the sectorizing circuit 13 by varying the scrambling parameters based on the identification information from the interfacing circuit 12.

If reference identification information is to be recorded on the medium 21 as hereinafter more fully described, such reference identification information may be recorded in a table-of-contents (TOC) area on the record medium 21. In this situation, reference identification information may be provided from the interface circuit 12 to a table-of-contents (TOC) generator 25 so as to form a signal which represents that such information is provided in the TOC area. Such signal from the TOC generator 25 is supplied to the driver 19, whereupon the reference identification information is recorded in the TOC area of the record medium 21.

An apparatus for reproducing data from the disc-shaped record medium 21 will now be described with reference to FIG. 4.

Figure 4:
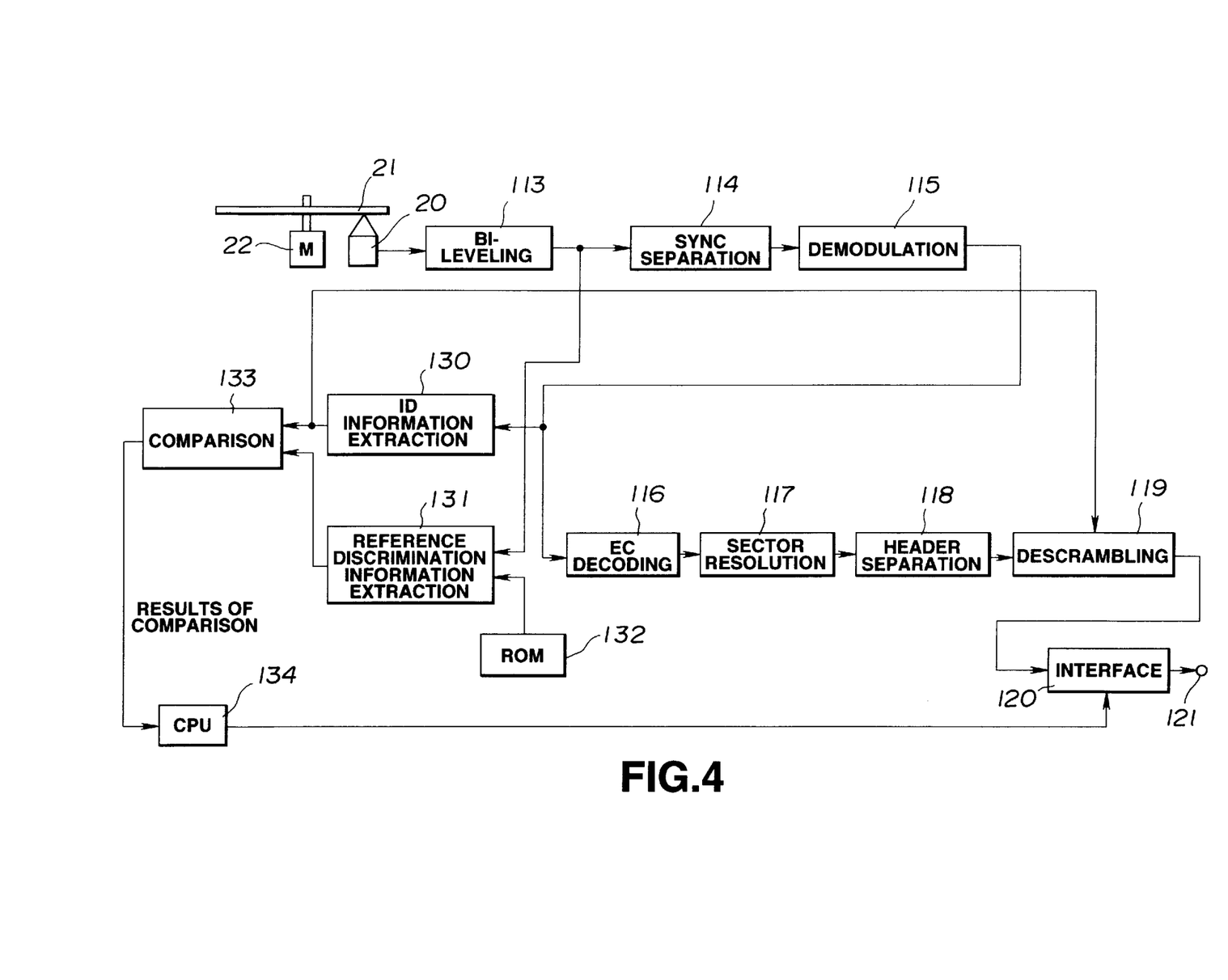
FIG. 4 is a diagram of a signal reproducing apparatus according to an embodiment of the present invention.

The present reproducing apparatus generally includes a bi-level circuit 113, a synchronization separation circuit 114, a demodulation circuit 115, an error correction decoding circuit 116, a sector resolution circuit 117, a header separation circuit 118, a descrambling circuit 119, an interface circuit 120, an identification information extraction circuit 130, a reference identification information extraction circuit 131, a read only memory (ROM) 132, a comparison circuit 133, and a central processing unit (CPU) 134 which are coupled as shown in FIG. 4.

The spindle motor 22 causes the disc-shaped record medium 21 to rotate so that data recorded thereon may be read out by the recording/reproducing head 20. Such read out signals are converted into bi-level digital data by the bi-level circuit 113 and supplied therefrom to the synchronization separation circuit 114. The synchronization separation circuit 114 is adapted to separate the synchronization signals added by the synchronization appendage circuit 18 (FIG. 2) from the received digital data signals. Output digital signals from the synchronization separation circuit 114 are supplied to the demodulation circuit 115, wherein the received signals are processed or demodulated in a manner substantially opposite to that performed by the modulation circuit 17 (FIG. 2). More specifically, the demodulation circuit may perform a 16 to 8 demodulation or processing procedure wherein the received 16 channel-bit data is converted into 8-bit data. Demodulated digital data from the demodulation circuit 115 is supplied to the identification information extraction circuit 130 and to the error correction decoding circuit 116.

The identification information extraction circuit 130 is adapted to receive the digital data from the demodulation circuit 115 and to extract therefrom identification information such as that which may have been substituted for part of a parity code and recorded on the recording medium 21.

The error correction decoding circuit 116 performs a decoding or processing operation which is substantially a reverse operation of that performed by the error correction encoding circuit 16 (FIG. 2). The processing performed by the error correction decoding circuit 116 may correct errors caused by defects or flaws in the recording medium 21 or errors obtained during the reproduction of recorded data. Furthermore, the error correction decoding circuit 116 may remove the identification information included in the data received from the demodulation circuit 115 so that the data supplied from the error correction decoding circuit does not include such identification information. The output data of the error correction decoding circuit 116 may be formed or resolved into sectors by the sector resolution circuit 117. An output of the sector resolution circuit 117 is supplied to the header separation circuit 118 wherein the header information may be separated from the received data and the leading portion of each sector is freed. The sector resolution circuit 117 and the header separation circuit 118 are respective counterpart circuits of the sectorizing circuit 13 and the header appendage circuit 15 (FIG. 2). An output of the header separation circuit 118 is supplied to the descrambling circuit 119 wherein a descrambling operation is performed which is substantially opposite to the scrambling operation performed by the scrambling circuit 14 (FIG. 2). Descrambled output data from the descrambling circuit is supplied by way of the interfacing circuit 120 to an output terminal 121.

If the signal recorded on the medium 21 had been ciphered in accordance with the identification information by, for example, the scrambling circuit 14, the reproduced signal is deciphered accordingly. That is, the identification information extracted by the identification information extraction circuit 130 is also supplied to a deciphering circuit, which may be included in the descrambling circuit 119, wherein the signal is deciphered by utilizing the identification information. As is to be appreciated, if the recorded signal had been ciphered using the identification information and the proper identification information is unavailable or not provided during signal reproduction such that the correct identification information is not supplied to the deciphering circuit, then the data may not be deciphered or decoded properly.

The identification information obtained by the identification information extraction circuit 130 is supplied to the comparator circuit 133. If identification information is not or cannot be extracted from the output data of the demodulation circuit 115, the identification information extraction circuit 130 may either output a signal so indicating or may supply no output signal. The comparator 133 may further receive reference identification information from the reference identification information extraction circuit 131. Such reference identification information may be the same as the identification information which indicates that the main signals are original signals. The comparator circuit 133 is adapted to compare the information from the identification information extraction circuit 130 to the reference identification information from the reference identification information extraction circuit 131 and to supply the results of such comparison to the CPU 134.

The reference identification information may be stored in the ROM 132 which is read therefrom by the reference identification information extraction circuit 131 and supplied to the comparator circuit 133. Alternatively, the reference identification information may be recorded on the recording medium 121, whereupon the reference identification information extraction circuit 131 extracts such recorded reference identification information from data read out from the record medium 21. For example, in this latter situation, output data from the bi-level circuit 113 may be supplied to the reference identification information extraction circuit 131 which extracts the recorded reference identification information therefrom and supplies the obtained reference identification information to the comparator circuit 133. The processing for the situation in which the reference identification information has been recorded on the record medium 21 will be more fully described hereinafter.

If the results of the comparison circuit 133 indicate that the output from the identification information extraction circuit 130 is substantially the same as the reference identification information from the reference identification information extraction circuit 131, the signals recorded on the record medium 21 are original signals or are signals other than copied signals. In such situation, the CPU 134 may supply a control signal to the interface circuit 120 to enable the reproduced signals to be outputted from the output terminal 121.

On the other hand, if the results of the comparison circuit 133 indicate that the output from the identification information extraction circuit 130 is different than or non-coincident with the reference identification information from the reference identification information extraction circuit 131, the signals recorded on the record medium 21 are not original signals but are copied signals. In such situation, the CPU 134 may supply a control signal to the interface circuit 120 to inhibit the reproduced signals from being outputted from the output terminal 121. In addition to preventing the reproduced non-original signals from being outputted whereupon the signals may be displayed or like, such procedure also prohibits copying the copied signals.

More specifically, copying a recording medium having original signals with identification information recorded thereon involves reproducing the recording medium by a signal reproducing apparatus and recording the reproduced signals onto another recording medium by a signal recording apparatus. If the recording medium having the original signals with the appended identification information is reproduced by such signal reproducing apparatus, the identification information (appended to the original signals) may be lost during the error correction decoding performed during reproduction by the signal reproducing apparatus. As a result, the signals reproduced from the recording medium may not contained the identification information. If the newly created record medium having the copied signals and not the identification information is reproduced by the present signal reproducing apparatus of FIG. 4, the identification information extraction circuit 130 could not extract identification information and, as such, the comparator circuit 133 would supply a signal to the CPU 134 indicating that the output of the identification information extraction circuit 130 is different than the reference identification information from the reference identification information extraction circuit 131 (thereby indicating that the reproduced signals are not original signals but are copied signals). As a result, the CPU 134 supplies a control signal to the interface circuit 120 to inhibit the reproduced signals from being outputted from the output terminal 121, thus prohibiting signals copied in an unauthorized manner from being further copied.

Processing performed by the scrambling circuit 14 and a procedure for ciphering the data signals produced therein based on the identification information will now be described.

Figure 5:
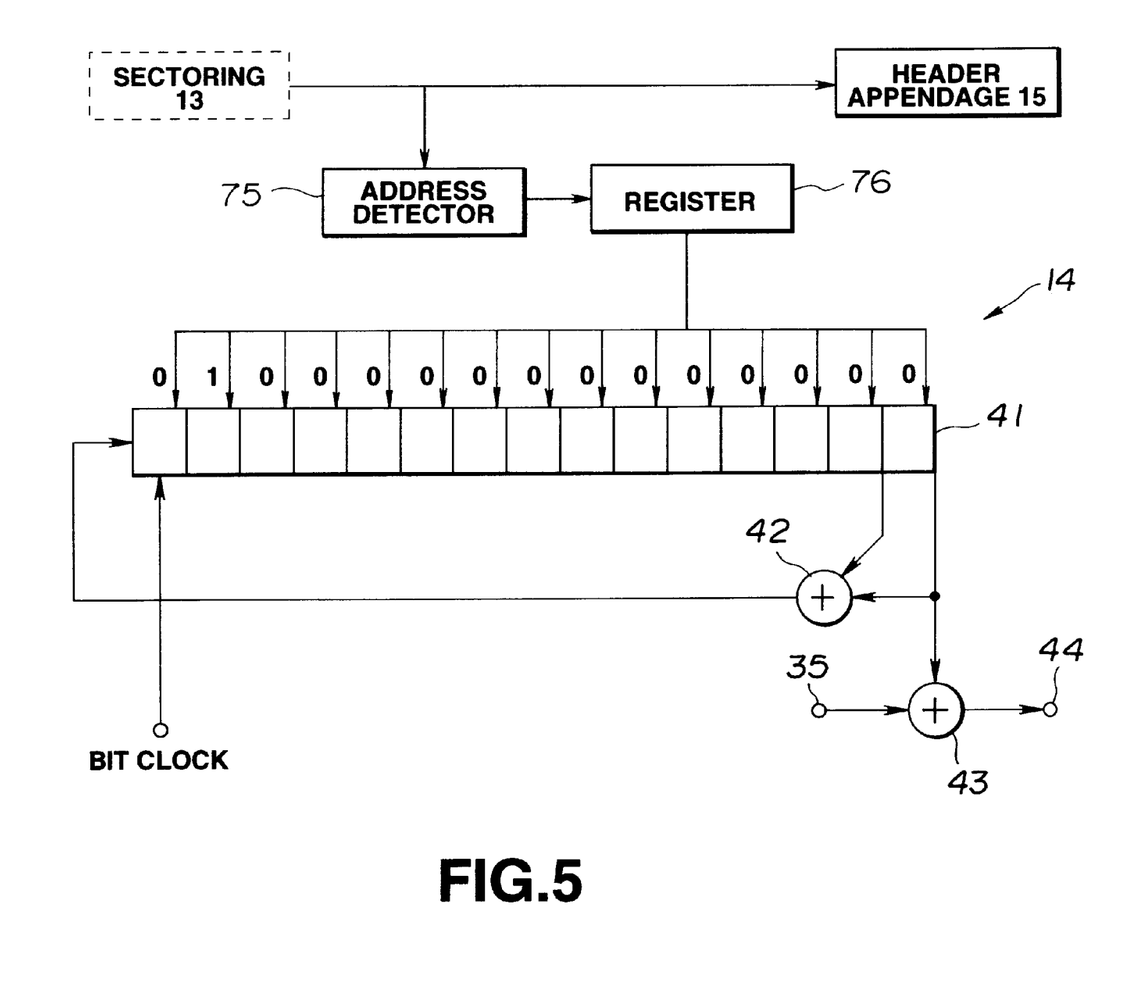
FIG. 5 is a diagram of a scrambling circuit for the signal recording apparatus of FIG. 2 according to an embodiment of the present invention.
Figure 6:
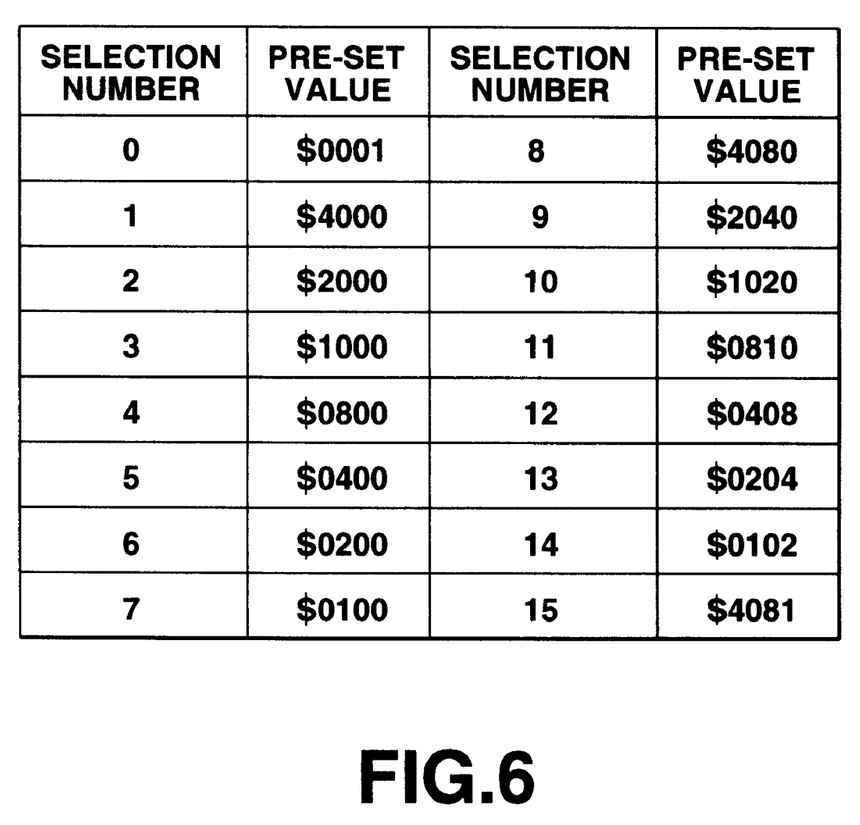
FIG. 6 is a table of pre-set values for the scrambling circuit of FIG. 5.

The scrambling circuit 14 may include a so-called parallel block synchronization type scrambler having a 15-bit shift register 41 as, for example, illustrated in FIG. 5. The scrambling circuit 14 may further include an address detector 75, a register 76, and ExOR circuits 42 and 43. An output from the sectoring circuit 13, which may include sector address information, is supplied to the address detector 75. A detected signal or address from the address detector 75 is supplied to the register 76, whereupon an output signal which may represent pre-set values is supplied to the register 41. Such pre-set or initial values, which may have values such as those shown in FIG. 6, may be set in the 15-bit shift register 41. (The pre-set values in FIG. 6 are expressed in hexadecimal form.) The selection numbers associated with the pre-set values shown in FIG. 6 correspond to the lower four bits of the sector addresses so that the pre-set values may be switched on a sector basis. The 15-bit shift register 41 may include a feedback loop form in accordance with a generating polynomial $x^{15}+x^n+1$ which uses the ExOR circuit 42. A bit clock signal may be supplied through an input bit clock terminal to the register 41. Such bit clock may be utilize to control the bit shifting performed by the register 41. Output data from the shift register 41 is supplied to the ExOR circuit 43 which also receives data from the sectorizing circuit 13 through a data input terminal 35. Such input data may be supplied in a so-called LSB first sequence in which the LSB side is temporally provided first. The input data is processed or ExORed by the ExOR circuit 43 and an output signal therefrom is supplied through an output terminal 44 to the header appendage circuit 15 (FIG. 2).

Figure 7:
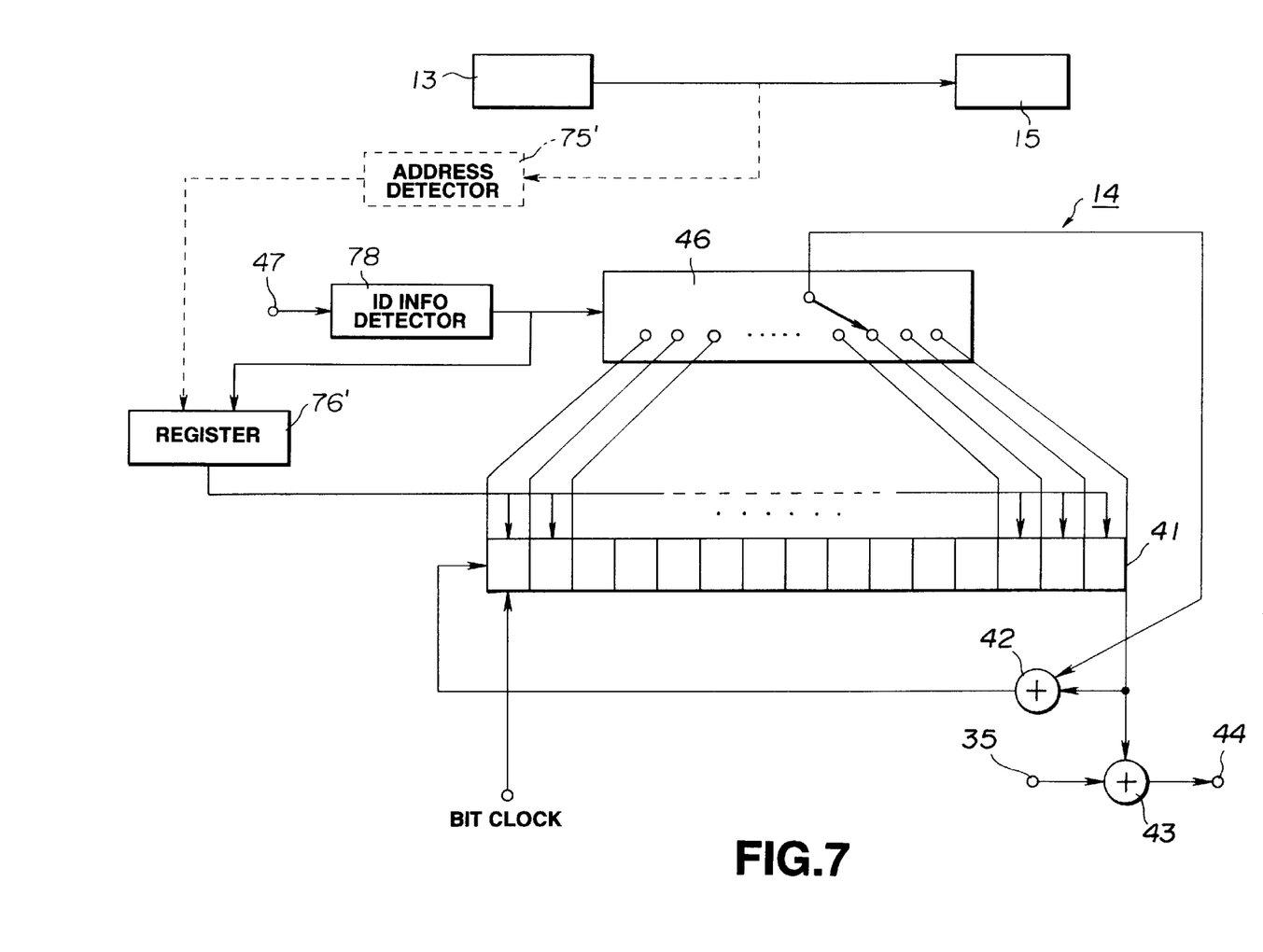
FIG. 7 is diagram of a scrambling circuit, in which polynomial and pre-set values may be varied, for the signal recording apparatus of FIG. 2 according to an embodiment of the present invention.

The above-mentioned polynomial and pre-set (initial) values may be varied in accordance with the identification information by using a scrambling circuit such as that illustrated in FIG. 7. As shown therein, such scrambling circuit 14' may include a register 76', an identification detector 78, a changeover switch 46, a shift register 41, and ExOR circuits 42 and 43. Identification information from the interface circuit 12 (FIG. 2) may be supplied through an input terminal 47 to the identification information detector 78 whereupon a control signal based on the detected identification information, which may be the lower four bits thereof, is supplied to the register 76'. Pre-set values may be stored in the register 76' and, in accordance with the control signal from the identification information detector 78, selected one(s) of the stored pre-set values may be supplied to the register 41, which may be a 15 bit shift register. A bit clock signal for controlling bit shifting may be supplied through an input bit clock terminal to the register 41. Outputs of the respective bits of the 15-bit shift register 41 may be supplied to fixed contacts of the changeover switch 46 which may be controlled by an output signal (such as the 4-bit control data signal) from the identification information detector 78. Output data from the changeover switch 46 and an output from the register 41 may be supplied to the ExOR circuit 42 so as to form a feedback loop similar to that previously described with reference to the scrambling circuit 14 of FIG. 5. Output data from the shift register 41 and data from the sectorizing circuit 13 through a data input terminal 35 are supplied to the ExOR circuit 43, whereupon the data may be processed or ExORed by the ExOR circuit 43 and supplied through an output terminal 44 to the header appendage circuit 15 (FIG. 2) in a manner similar to that previously described with reference to the scrambling circuit 14 of FIG. 5.

Thus, the selection of the stored pre-set values from the register 76' and the operation of the changeover switch 46 is controlled in accordance with the identification information. As a result, the value of n of the generating polynomial $x^{15}+x^n+1$ may be changed in accordance with the identification information. The pre-set values may be varied by logical operations of the pre-set values with byte values of, for example, 16-byte identification information. Such logical operations may include ExORing, ANDing, ORing and bit shifting.

As an alternative to selecting the pre-set values from the stored values in the register 76' in accordance with the lower four bit control signal from the identification information detector 78, such selection may be based upon an output signal from an address detector 75'. That is, an output signal from the sectoring circuit 13 may be supplied to the address detector 75' which may detect a sector address therefrom and supply an output control signal to the register 76'. The selection of pre-set values in the register 76' may be based on such control signal, which may correspond to the lower four bits of the detected address.

The arrangement of varying the polynomial is not limited to that described above with reference to FIG. 7. For example, a scrambling circuit having a different number of stages or taps in the shift register may be utilized. Additionally, control signals representing other than the lower four bits may be used.

Ciphering signals to be recorded in accordance with the identification information may discourage unauthorized copying of signals. That is, if a recording medium having signals recorded thereon which are ciphered on the basis of the identification information is copied in an unauthorized manner and distributed, the signals on such copy may not be deciphered without the identification information (which is not available in this situation). Accordingly, the signals from the unauthorized copy may not be properly reproduced.

Thus, above-described identification information (which is appended to the main signals) may be utilized to provide an indication as to whether the signals recorded on a recording medium are original signals or a copy thereof. Accordingly, the present recording apparatus of FIG. 2 may be used to record identification information on the recording medium 21 which indicates whether the main signals are original signals or a copy thereof, and the present signal reproducing apparatus of FIG. 4 may determine whether the signals recorded on the record medium 21 are original signals or copied signals on the basis of the identification information signals obtained during the reproduction of the record medium 21 whereupon reproduced signals may be supplied therefrom or inhibited from being supplied in accordance with the results of such determination. As a result, unauthorized copying may be discouraged or prevented.

Although in the above-described embodiment of the present invention the identification information is appended to the original signals, the present invention is not so limited. That is, the identification information may be appended to the signals other than the original signals. For example, the identification information may be appended to signals copied once from the original signals when a first copy is allowed and a second or subsequent copies are prohibited.

With regard to the reference identification information recorded on the record medium, as described in the explanation of the recording apparatus in FIG. 2, the reference identification information may be recorded in the TOC of the record medium 21, the reference identification may be read out by the recording/reproducing head 20. Also, the reference identification information may be stored at a site on the recording medium 21 which may be specified on a sector basis by storage site information, or alternatively, may be stored on sites other than those on the recording medium 21. The storage site information may be recorded in a table of contents (TOC) area or in another predetermined sites. As an example, the storage site information may be stored as part of the TOC information in the lead-in area 103 of the record medium 21. This arrangement may protect against alteration of the reference identification information. During reproduction, the storage site information is read out and, based thereon, the reference identification information for deciphering may be obtained. In addition to being recorded on the record medium 21, the reference identification information may be recorded on the medium by other recording techniques, such as those involving bar codes, wobbling or UV rays. Furthermore, as previously described, the reference identification information may be stored on sites other than those on the recording medium 21. Such other sites may be an EEPROM or in an information storage device connected to or included within the reproducing apparatus, such as IC card or a so-called PCMCIA (personal computer memory card international association). Additionally, the reference identification information may be supplied from a communication apparatus such as a modem/LAN via a communication interface or from an external device through the communication interface or from a remote controlled device by way of a remote-controlled reception device.

Further, in addition to representing information which indicates whether data is original or a copy thereof or key information for ciphering, the reference identification information may represent a producer identification (ID), a manufacturer ID, a formatter ID, or copy management information, such as copy inhibit/permit information.

Additionally, the reference identification information may be provided from one type of recording medium to another. However, to resist unauthorized correction of the identification information, the reference information may be changed from one recording medium to another.

The main signals may be compression encoded. For example, video signals may be compression encoded in accordance with a MPEG2 standard developed by the Moving Picture Exerts Group (MPEG), and audio signals may be encoding by adaptive transform acoustic coding (AORTIC) which may account for acoustic characteristics of a human.

In addition to representing moving pictures, the video signals may represent pictures, such as still pictures, graphics or characters.

The recording medium may be any of a plurality of disc-type media, such as an optical disc on which information may be recorded by the use of so-called pits, an optical disc wherein signals may be recording only once, an overwritable magneto-optical disc, an organic dye type optical disc, an optical disc on which information may be recorded by a UV laser light beam, an optical disc having a multi-layer recording film and so forth. Furthermore, in addition to a disc-type medium, other types of recording medium may be utilized. For example, a tape-type record medium such as a video tape, a semiconductor record medium such as an IC card or a memory element, and a magnetic disc-type record medium such as a hard disc or a flexible disc, may also be utilized.

In addition to using identification information with signals recorded on/reproduced from a record medium as described above, such identification information may also be similarly used in transmitting/receiving signals by way of a signal transmission medium such as a telephone network, a light cable or radio waves, involving surface communication or satellite communication. The effects and/or benefits achieved of appending identification signals to the transmission/reception signals are similar to those achieved with the above-described recording/reproducing.

Figure 8:
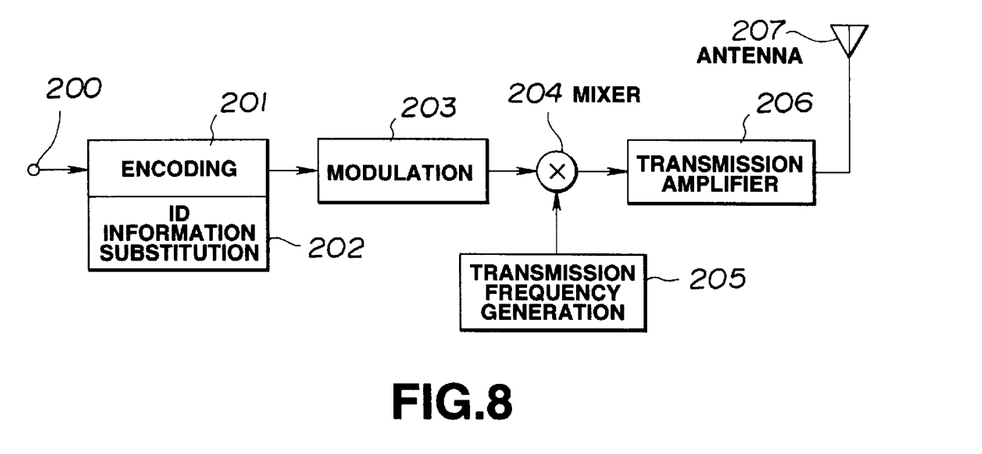
FIG. 8 is a diagram of a transmission apparatus according to an embodiment of the present invention.
Figure 9:
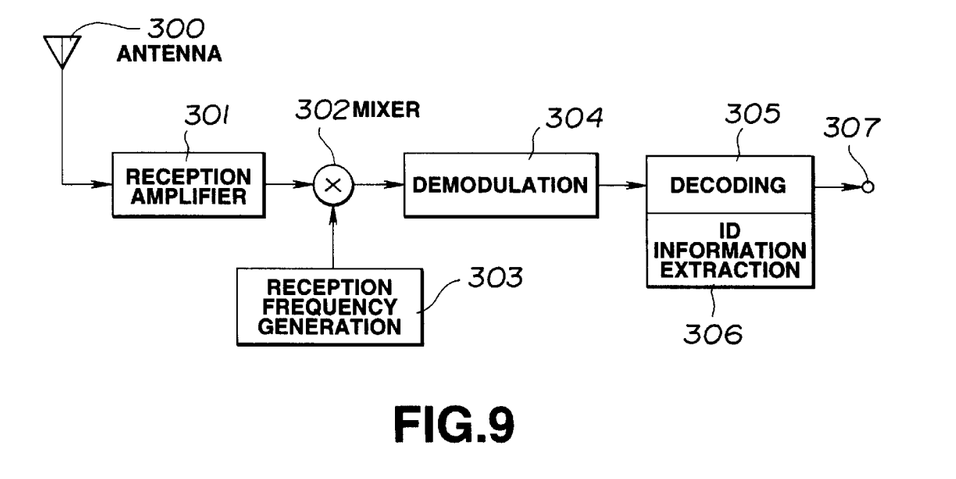
FIG. 9 is a diagram of a reception apparatus according to an embodiment of the present invention.

FIGS. 8 and 9 respectively illustrative a transmission system and a reception system according to the present invention.

In the transmission system of FIG. 8, digital video or audio signals may be supplied through a terminal 200 to an encoding circuit 201. Such encoding circuit 201 may have a structure corresponding to the circuit components from the interfacing circuit 12 to the error correction encoding circuit 16 of FIG. 2. Further, the encoding circuit 201 includes an identification information substitution circuit 202 which may be similar to the identification information substitution circuit 23 of FIG. 2. Accordingly, the identification information substitution circuit 202 adds identification information to signals having error correction codes in a manner similar to that previously described. Encoded signals having the appended identification information are supplied from the encoding circuit 201 to a modulation circuit 203 so as to be digitally modulated in a predetermined manner. Modulated signals from the modulation circuit 203 and transmission carrier frequency signals from a transmission frequency generating circuit 205 are supplied to a mixer circuit 204. The mixer 204, which may include a linear multiplier, modulates the transmission carrier frequency signals with the signals from the modulation circuit 203. A transmission signal having a transmission frequency range is supplied from the mixer circuit 204 to a transmission amplifier 206 so as to be amplified to a predetermined level and transmitted by way of an antenna 207.

In the reception system of FIG. 9, a signal received by an antenna 300 may be amplified by a reception amplifier 301 to a predetermined level. An output signal of the reception amplifier 301 and a reception frequency signal phase-synchronized with the carrier waves from a reception frequency generating circuit 303 are supplied to a mixer circuit 302. The modulated signal of the carrier wave, that is the reception signals, are supplied from the mixer circuit 302 to a demodulation circuit 304 wherein the signals are demodulated or processed in a substantially opposite manner to that performed by the modulation circuit 203 of the transmission system of FIG. 8. The demodulated signal is supplied to a decoding circuit 305 wherein a decoding operation is performed which is substantially opposite of that performed by the encoding circuit 201 of the transmission system. The decoding circuit 305 may include an identification information extraction circuit 306 for extracting the identification information and utilizing the extracted identification information in a manner similar to that previously described. A decoded signal from the decoding circuit 305 is outputted at a terminal 307.

Figure 10:
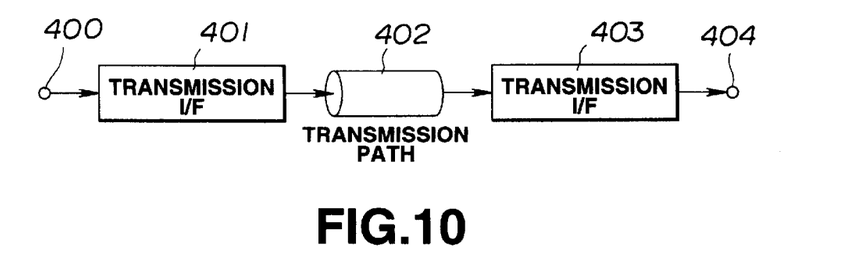
FIG. 10 is a diagram of a transmission/reception apparatus wherein signals may be transmitted/received over a transmission line.

FIG. 10 illustrates an arrangement in which signals may be transmitted or received over a transmission line such as a telephone network or a light cable. A signal having appended identification information (such as that which may be obtained from the circuit 17 of FIG. 2) may be supplied through an input terminal 400 to a transmission interfacing circuit 401. Such signal may be supplied from the reception side by way of a transmission line 402 to a transmission interfacing circuit 403. Processing performed in the transmission interfacing circuit 403 may be similar to that performed in the circuits downstream of the demodulation circuit 115 of FIG. 4. A signal from the transmission interfacing circuit 403 may be output through a terminal 404.

Although in describing the present invention, the identification information was described as representing whether data is original or a copy thereof or as representing key information for ciphering, the present invention is not so limited. That is, the identification information may be used to represent other items or parameters.

Although preferred embodiments of the present invention and modifications thereof have been described in detail herein, it is to be understood that this invention is not limited to these embodiments and modifications, and that other modifications and variations may be affected by one skilled in the art without departing from the spirit and scope of the invention as defined by the appended claims.

What is claimed is:

1. A signal recording method comprising the steps of:
   appending an error correction code to a predetermined unit of a digital signal;
   replacing a predetermined portion of the error correction code with specified information, in which said specified information includes information selected from a group including (i) information utilized in determining whether during a reproducing operation the digital signal is to be properly reproduced and/or outputted, and (ii) information utilized in performing a ciphering operation; and
   recording the digital signal having the error correction code partially replaced by said specified information onto a record medium.

2. The signal recording method according to claim 1, wherein said specified information is provided in a plurality of predetermined units of said digital signal so as to provide redundancy.

3. The signal recording method according to claim 1, further comprising the step of appending an error correction code to said specified information.

4. The signal recording method according to claim 3, wherein the recording step includes recording said specified information and the error correction code for said specified information in a plurality of predetermined units of said digital signal.

5. The signal recording method according to claim 1, wherein said predetermined unit having said specified information is arranged in an area of said record medium which is normally inaccessible to an operator.

6. The signal recording method according to claim 1, further comprising the step of ciphering said predetermined unit of said digital signal using said specified information and wherein the recording step records the ciphered digital signal onto said record medium.

7. The signal recording method according to claim 1, further comprising the step of recording information pertaining to a storage site of said predetermined unit of said digital signal having said specified information onto said record medium.

8. A signal reproducing method comprising the steps of:
   reproducing a digital signal from a record medium, said digital signal having a predetermined unit with an error correction code in which a predetermined portion of said error correction code has been replaced with specified information, in which said specified information includes information selected from a group including (i) information utilized in determining whether the digital signal is to be properly reproduced and/or outputted, and (ii) information utilized in performing a ciphering operation; and
   extracting said specified information from said predetermined portion of the error correction code before decoding the error correction code.

9. The signal reproducing method according to claim 8, wherein said specified information has an appended error correction code and further comprising the step of decoding the error correction code for said specified information.

10. The signal reproducing method according to claim 9, wherein the reproducing step includes reproducing said specified information and the error correction code for the specified information from a plurality of predetermined units of said digital signal from the record medium.

11. The signal reproducing method according to claim 8, wherein said predetermined unit of said digital signal recorded on said record medium is ciphered and further comprising the step of decoding the ciphered predetermined unit of said digital signal using the specified information.

12. The signal reproducing method according to claim 8, further comprising the steps of comparing the extracted specified information to reference information and outputting the reproduced digital signal or inhibiting the reproduced digital signal from being outputted depending on the results of the comparison.

13. The signal reproducing method according to claim 8, further comprising the step of reproducing information pertaining to a storage site of said predetermined unit of said digital signal having said specified information from said record medium and wherein said predetermined unit of said digital signal having said specified information is reproduced based on the storage site information.

14. The signal reproducing method according to claim 12, further comprising the step of reproducing information pertaining to a storage site of said reference information from said record medium.

15. A signal transmission method comprising the steps of:
    appending an error correction code to a predetermined unit of a digital signal;
    replacing a predetermined portion of the error correction code with specified information; and
    transmitting the digital signal having the error correction code partially replaced by said specified information;
    in which said specified information includes information selected from a group including (i) information utilized in determining whether the digital signal is to be properly obtained after receipt of the transmitted digital signal, and (ii) information utilized in performing a ciphering operation.

16. The signal transmitting method according to claim 15, wherein said specified information is provided in a plurality of predetermined units of said digital signal so as to provide redundancy.

17. The signal transmission method according to claim 15, further comprising the step of appending an error correction code to said specified information.

18. The signal transmission method according to claim 15, wherein the transmitting step includes transmitting said specified information and the error correction code for said specified information in a plurality of predetermined units of said digital signal.

19. The signal transmission method according to claim 15, wherein said predetermined unit having said specified information is arranged in an area which is normally inaccessible to an operator.

20. The signal transmission method according to claim 15, further comprising the step of ciphering said predetermined unit of said digital signal using said specified information and wherein the transmitting step transmits the ciphered digital signal.

21. The signal transmission method according to claim 15, further comprising the step of transmitting information pertaining to a storage site of said predetermined unit of said digital signal having said specified information.

22. A signal receiving method comprising the steps of:
    receiving a digital signal having a predetermined unit with an error correction code in which a predetermined portion of said error correction code has been replaced with specified information, in which said specified information includes information selected from a group including (i) information utilized in determining whether the digital signal is to be properly obtained and/or outputted after receipt thereof, and (ii) information utilized in performing a ciphering operation; and
    extracting said specified information from said predetermined portion of the error correction code before decoding the error correction code.

23. The signal receiving method according to claim 22, wherein said specified information has an appended error correction code and further comprising the step of decoding the error correction code for said specified information.

24. The signal receiving method according to claim 23, wherein the receiving step includes receiving said specified information and the error correction code for the specified information from a plurality of predetermined units of said digital signal.

25. The signal receiving method according to claim 22, wherein said predetermined unit of the received digital signal is ciphered and further comprising the step of decoding the ciphered predetermined unit of said digital signal using the specified information.

26. The signal receiving method according to claim 22, further comprising the steps of comparing the extracted specified information to reference information and outputting the received digital signal or inhibiting the received digital signal from being outputted depending on the results of the comparison.

27. The signal receiving method according to claim 22, further comprising the step of receiving information pertaining to a storage site of said predetermined unit of said digital signal having said specified information and wherein said predetermined unit of said digital signal having said specified information is received based on the storage site information.

28. The signal receiving method according to claim 26, further comprising the step of receiving information pertaining to a storage site of said reference information.

29. A signal recording apparatus comprising:
    means for appending an error correction code to a predetermined unit of a digital signal;
    means for replacing a predetermined portion of the error correction code with specified information, in which said specified information includes information selected from a group including (i) information utilized in determining during a reproducing operation whether the digital signal is to be properly reproduced and/or outputted, and (ii) information utilized in performing a ciphering operation; and
    means for recording the digital signal having the error correction code partially replaced by said specified information onto a record medium.

30. The signal recording apparatus according to claim 29, wherein said specified information is provided in a plurality of predetermined units of said digital signal so as to provide redundancy.

31. The signal recording apparatus according to claim 29, further comprising means for appending an error correction code to said specified information.

32. The signal recording apparatus according to claim 31, wherein the recording means includes means for recording said specified information and the error correction code for said specified information in a plurality of predetermined units of said digital signal.

33. The signal recording apparatus according to claim 29, wherein said predetermined unit having said specified information is arranged in an area of said record medium which is normally inaccessible to an operator.

34. The signal recording apparatus according to claim 29, further comprising means for ciphering said predetermined unit of said digital signal using said specified information and wherein the recording means records the ciphered digital signal onto said record medium.

35. The signal recording apparatus according to claim 29, further comprising means for recording information pertaining to a storage site of said predetermined unit of said digital signal having said specified information onto said record medium.

36. A signal reproducing apparatus comprising:
   means for reproducing a digital signal from a record medium, said digital signal having a predetermined unit with an error correction code in which a predetermined portion of said error correction code has been replaced with specified information, in which said specified information includes information selected from a group including (i) information utilized in determining whether the digital signal is to be properly reproduced and/or outputted, and (ii) information utilized in performing a ciphering operation; and
   means for extracting said specified information from said predetermined portion of the error correction code before decoding the error correction code.

37. The signal reproducing apparatus according to claim 36, wherein said specified information has an appended error correction code and further comprising means for decoding the error correction code for said specified information.

38. The signal reproducing apparatus according to claim 37, wherein the reproducing means includes means for reproducing said specified information and the error correction code for the specified information from a plurality of predetermined units of said digital signal from the record medium.

39. The signal reproducing apparatus according to claim 36, wherein said predetermined unit of said digital signal recorded on said record medium is ciphered and further comprising means for decoding the ciphered predetermined unit of said digital signal using the specified information.

40. The signal reproducing apparatus according to claim 36, further comprising means for comparing the extracted specified information to reference information and for outputting the reproduced digital signal or inhibiting the reproduced digital signal from being outputted depending on the results of the comparison.

41. The signal reproducing apparatus according to claim 36, further comprising means for reproducing information pertaining to a storage site of said predetermined unit of said digital signal having said specified information from said record medium and wherein said predetermined unit of said digital signal having said specified information is reproduced based on the storage site information.

42. The signal reproducing apparatus according to claim 40, further comprising means for reproducing information pertaining to a storage site of said reference information from said record medium.

43. A signal transmission apparatus comprising:
   means for appending an error correction code to a predetermined unit of a digital signal;
   means for replacing a predetermined portion of the error correction code with specified information; and
   means for transmitting the digital signal having the error correction code partially replaced by said specified information;
   in which said specified information includes information selected from a group including (i) information utilized in determining whether the digital signal is to be properly obtained after receipt of the transmitted digital signal, and (ii) information utilized in performing a ciphering operation.

44. The signal transmitting apparatus according to claim 43, wherein said specified information is provided in a plurality of predetermined units of said digital signal so as to provide redundancy.

45. The signal transmission apparatus according to claim 43, further comprising means for appending an error correction code to said specified information.

46. The signal transmission apparatus according to claim 45, wherein the transmitting means includes means for transmitting said specified information and the error correction code for said specified information in a plurality of predetermined units of said digital signal.

47. The signal transmission apparatus according to claim 43, wherein said predetermined unit having said specified information is arranged in an area which is normally inaccessible to an operator.

48. The signal transmission apparatus according to claim 43, further comprising means for ciphering said predetermined unit of said digital signal using said specified information and wherein the transmitting means transmits the ciphered digital signal.

49. The signal transmission apparatus according to claim 43, further comprising means for transmitting information pertaining to a storage site of said predetermined unit of said digital signal having said specified information.

50. A signal receiving apparatus comprising:
   means for receiving a digital signal having a predetermined unit with an error correction code in which a predetermined portion of said error correction code has been replaced with specified information, in which said specified information includes information selected from a group including (i) information utilized in determining whether the digital signal is to be properly obtained and/or outputted after receipt thereof, and (ii) information utilized in performing a ciphering operation;
   means for decoding the error correction code of the digital signal; and
   means for extracting said specified information from said predetermined portion of the error correction code before decoding the error correction code.

51. The signal receiving apparatus according to claim 50, wherein said specified information has an appended error correction code and further comprising means for decoding the error correction code for said specified information.

52. The signal receiving apparatus according to claim 51, wherein the receiving means includes means for receiving said specified information and the error correction code for the specified information from a plurality of predetermined units of said digital signal.

53. The signal receiving apparatus according to claim 50, wherein said predetermined unit of the received digital signal is ciphered and further comprising means for decoding the ciphered predetermined unit of said digital signal using the specified information.

54. The signal receiving apparatus according to claim 50, further comprising means for comparing the extracted specified information to reference information and for outputting the received digital signal or inhibiting the received digital signal from being outputted depending on the results of the comparison.

55. The signal receiving apparatus according to claim 50, further comprising means for receiving information pertaining to a storage site of said predetermined unit of said digital signal having said specified information and wherein said predetermined unit of said digital signal having said specified information is received based on the storage site information.

56. The signal receiving apparatus according to claim 54, further comprising means for receiving information pertaining to a storage site of said reference information.

57. A record medium having recorded thereon digital signals having an error correction code in which a portion of said error correction code is replaced by specified information, in which said specified information includes information selected from a group including (i) information utilized in determining whether during a reproducing operation the digital signal is to be properly reproduced and/or outputted, and (ii) information utilized in performing a ciphering operation.

58. The record medium according to claim 57, wherein said specified information is provided in a plurality of predetermined units of said digital signal so as to provide redundancy.

59. The record medium according to claim 57, wherein an error correction code for said specified information is recorded on the record medium.

60. The record medium according to claim 59, wherein said specified information and the error correction code for said specified information are recorded in a plurality of predetermined units of said digital signal.

61. The record medium according to claim 57, wherein said specified information is arranged in an area of said record medium which is normally inaccessible to an operator.

62. The record medium according to claim 57, wherein the error correction code is formed in a predetermined unit of the digital signals.

63. The record medium according to claim 57, wherein information pertaining to a storage site of said predetermined unit of said digital signal having said specified information is recorded onto said record medium.

64. The record medium according to claim 57, wherein information pertaining to a storage site for reference information which is compared to the specified information during reproduction for controlling playback processing is recorded onto said record medium.

65. An apparatus for recording a digital signal, comprising;
 means for generating an error correction code for said digital signal at a predetermined unit and for appending the error correction code to said digital signal;
 means for replacing a predetermined portion of the error correction code with key information and for generating a replaced digital signal having the error correction code which is partially replaced by the key information, in which said key information includes information utilized in performing a ciphering operation; and
 recording means for recording said replaced digital signal on a record medium.

66. An apparatus for reproducing a digital signal having an error correction code from a record medium, said error correction code being appended to a predetermined unit of said digital signal and being partially replaced by key information, in which said key information includes information utilized in performing a ciphering operation, said apparatus comprising:
 means for reproducing the digital signal from the record medium so as to form a reproduced digital signal;
 means for correcting said reproduced digital signal based on said error correction code so as to form a corrected digital signal; and
 extracting means for extracting the key information from the reproduced digital signal.

67. A reproducing apparatus according to claim 66, wherein the correcting means includes means for eliminating said key information from said reproduced digital signal so that said corrected digital signal does not include said key information.

68. A reproducing apparatus according to claim 67, further comprising comparing means for comparing the key information extracted by said extracting means with reference information, and controlling means for controlling a reproducing operation of the digital signal based on the result of the comparison by said comparing means.

69. A reproducing apparatus according to claim 68, further comprising a memory for storing said reference information, and second extracting means for extracting said reference information from said memory.

70. A reproducing apparatus according to claim 68, wherein said digital signal includes said reference information, and said apparatus further comprises second extracting means for extracting said reference information from said digital signal.

71. A record medium readable by a reproducing device, said record medium having a readable signal recorded thereon which includes a digital signal having an error correction code which is partially replaced by key information, in which said key information includes information utilized in performing a ciphering operation, said error correction code being appended to said digital signal in a predetermined unit.

72. A record medium according to claim 71, wherein said record signal includes reference information for comparison with said key information.

* * * * *